Sept. 1, 1970 J. W. DAVIS 3,526,773

BAR CODE APPLYING AND SENSING METHOD

Filed Sept. 12, 1966

INVENTOR.
JOSEPH W. DAVIS

BY Alfred Stapler

ATTORNEY

United States Patent Office 3,526,773
Patented Sept. 1, 1970

3,526,773
BAR CODE APPLYING AND SENSING METHOD
Joseph W. Davis, Chester Heights, Pa., assignor to General Atronics Corporation, Wyndmoor, Pa., a corporation of Pennsylvania
Filed Sept. 12, 1966, Ser. No. 578,600
Int. Cl. G08c 9/06
U.S. Cl. 250—219 8 Claims

ABSTRACT OF THE DISCLOSURE

A complete bar code pattern for subsequent photoelectric scanning is applied to a container in multiple stages, one portion of the pattern being applied prior to filling of the container and an additional portion of the pattern being applied on the occasion of such filling.

This invention relates to improvements in the utilization of optical bar codes and particularly to improvements in the utilization of such bar codes to identify the contents and other parameters of packages, cans, bottles and the like.

Bar codes, consisting of lines or bars printed in predetermined geometric patterns on containers, or on the labels or wrappings for containers, are currently gaining wide acceptance for a variety of purposes. For example, in the pharmaceutical industry, bar codes are used to help insure that a given drug container actually contains the intended product and is also provided with proper ancillary information on the outside of the container and possibly also in pamphlets inserted into the container. To this end, each product or type of information is represented by a particular pattern of bars in the bar code and the container is scanned, at some convenient point in the processing of the container, by photoelectric scanning means which respond to the presence of the desired bar code pattern to permit the unimpeded further processing of the container, while responding to different code patterns, denoting the existence of some anomaly, to give warning, interrupt the processing, or initiate some other remedial action.

Heretofore the utilization of these code bar patterns has been regarded as a unitary operation ,involving the printing of the entire bar code pattern as essentially a single operation, as a result of which the code pattern which resulted represented the totality of the information to be verified by the photo-electric scanning operation.

It is a principal object of the present invention to increase the usefulness of employment of optical bar codes and their related photoelectric scanning techniques.

It is another object of the invention to enhance the versatility of the above-mentioned techniques.

It is still another object to attain the above-mentioned objectives without detracting from the other desirable aspects of bar code utilization, including accuracy, reliability and simplicity.

To achieve these objects and others which will appear, in accordance with my invention, the process of applying the entire bar code pattern which is ultimately to be photoelectrically scanned is subdivided into separate steps in which different portions of the pattern, representing significantly different types of information, are applied. In particular, at least one portion of the bar code pattern is applied substantially contemporaneously with (i.e. during or shortly before or after) the insertion of the contents into the container, the remainder of the bar code pattern having previously been applied in the course of manufacture of the container or other product information-bearing elements, such as labels, applied to the container.

For further details reference is made to the description which follows in the light of the accompanying drawings wherein.

Figures 1, 2:
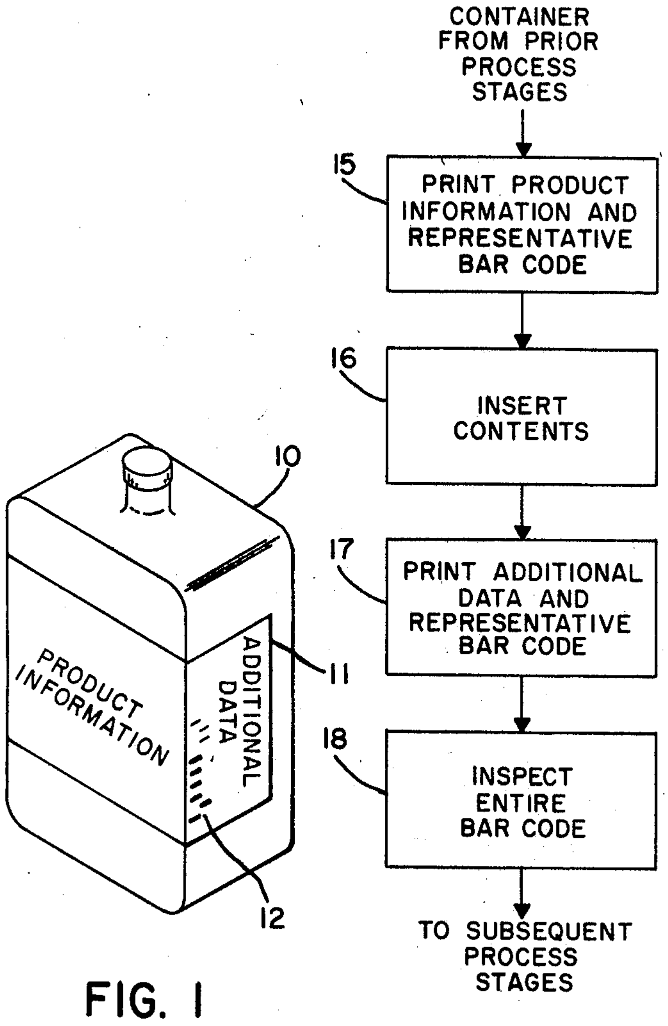
FIG. 1 illustrates one form of container employed in the practice of the invention.
FIG. 2 is a flow diagram showing the steps which are performed in accordance with one form of the invention.

Illustrated in FIG. 1, to which reference may now be had, there is a bottle 10 provided with a label 11 of the type conventionally used on bottles containing pills or other pharmaceutical products. Such a label normally extends completely across one face of the bottle 10 and also extends at least part-way along two of the adjoining faces of the bottle. It is common practice to imprint the product information relating to the contents of the bottle on the center portion of the label 11, i.e. on that portion which extends across the full width of one face. This is indicated in FIG. 1 by the words "PRODUCT INFORMATION" shown on that portion of the label 11. In practice, this product information may consist of the chemical or proprietary name of the product, or both, the name of the manufacturer or distributor, weight, quantity and possibly advertising or design features. On the other hand, the portions of the label which wrap around the adjoining sides of the bottle are typically reserved for other types of information, such as clinical details and, what is more important from the standpoint of the present invention, data which vary from time to time even for products which are identical in all other respects. These variable data include such things as the date on which the bottle was filled, the expiration date for use of the contents if the product has diminishing potency, and inscription specified by governmental regulations, which in turn change from time to time or from place to place. These variable portions of information have been denoted in FIG. 1 by the words "ADDITIONAL DATA" shown on one of the end portions of label 11.

The bar code pattern which is applied to this label for the sake of the photoelectric inspection technique here under consideration is preferably also located on this end portion of the label 11, thereby placing it around the corner, so to speak, from the product information appearing on the center section of the label. This reduces the obstrusiveness of the code pattern and also reduces the likelihood that the bar code pattern will be accidentally defaced. Such a bar code pattern has been illustratively shown in FIG. 1 at 12. It will be noted that certain code bars of this pattern have been shown in heavy lines, while others are shown in lighter lines. The purpose of this is to distinguish between the two groups of code bars applied at different periods of time, as hereinafter more fully explained, rather than to denote any difference in appearance between the two different groups which may, in practice, be either all alike or visually distinguishable from each other, depending on the particular equipment which is used to apply them or to photoelectrically sense their presence and arrangement. It will also be understood that the particular bar code pattern shown is purely illustrative and that a wide variety of specific patterns may be employed depending on the number of different bar code combinations required to provide appropriate identification of different products and other information, and depending also on the characteristics of the equipment used to inspect these code patterns.

Referring now to the flow diagram of FIG. 2, the process constituting one embodiment of my invention commences with a container such as the bottle 10 of FIG. 1, on whose label there has previously been printed less than all of the additional data, and some but not the entirety of the bar code pattern. Specifically, the portion of the bar code pattern which has been pre-printed, for example, that shown in heavy lines bars at 12 in FIG. 1, is that which denotes the intended product content of the container. The application of this partial set of printed information is indicated by rectangle 15 in FIG. 2.

The next process step, represented by rectangle 16 in FIG. 2, consists of the insertion of the contents into the container 10 of FIG. 1. The next following step is the application, to the label 11 of container 10, of the additional printed information not previously present thereon and also the application of the previously missing portions of the bar code pattern which, in the specific illustrative case under discussion, would consist of the light-line code bars included within the code bar pattern 12 of FIG. 1. These light code bars would be representative of the simultaneously applied additional information, e.g. of the date on which this operation takes place. This step is denoted by rectangle 17 in FIG. 2.

The final step of the process embodying my invention, denoted in FIG. 2 by rectangle 18, consists of photoelectrically scanning the entire bar code pattern 12 of the container of FIG. 1 in order to determine whether this entire bar code 12 consists of the proper pattern to insure that not only the proper product information, but also the proper additional data are present on the label 11 placed on that container. Thereafter the container 10 proceeds to whatever subsequent processing stages it is normally subject, such as wrapping, boxing, shipping, etc.

The equipment which is employed to perform the processes represented by blocks 15 through 18 of FIG. 2 may take any of a variety of conventional forms, and it is therefore not deemed necessary to discuss it at length herein. Suffice it to point out that various forms of conventional equipment are available for printing on labels the information referenced in rectangle 15 of FIG. 2 and applying the labels printed with such information to containers such as shown in FIG. 1. Likewise, conventional forms of bottle filling equipment are known which are useful for performance of the process steps indicated by rectangle 16 of FIG. 2, and so are on-line imprinters suitable for performing the steps represented by rectangle 17. Finally, with respect to rectangle 18 of FIG. 2, various conventional photoelectric code sensing means are also known, as, for example, those of Pat. 3,152,256 assigned to the assignee of the present invention.

The photoelectric scanning of the bar code pattern such as illustrated at 12 in FIG. 1 normally depends on moving the container provided with this bar code past the photoelectric sensing elements. This may be accomplished in a variety of ways. However, one preferred way which fits in well with the other conventional techniques employed in processing containers in the form of bottles, gives rise to the specific process represented in FIG. 3 to which reference may now be had. As shown by rectangle 19 and 20 in FIG. 3, this process begins with the same steps as that of FIG. 2, namely application of product information and portions of the bar code pattern representative thereof, followed by insertion of the contents into the bottle. For this latter step, represented by rectangle 20 in FIG. 3, the bottles are typically carried one after the other past a filling station in an upright position with the central portion of each label containing the product information parallel to the direction of travel of the bottles. As a result the end of the label 11 on which the bar code, together with additional information applied at the time of filing, is preferably placed faces the space between successive bottles where it is normally inconvenient to either apply additional printed data or scan the bar code photoelectrically. In accordance with the invention embodied in the process of FIG. 3, the bottles after filling (and capping) are preferably laid on their sides, while still continuing to progress, so as to cause the side of each bottle containing the bar code pattern 12 to face upwardly. This step is denoted by rectangle 21 in FIG. 3. This step is then followed by the printing and inspecting operations denoted by rectangles 22 and 23 and corresponding to the like operations in FIG. 2, after which the bottles may be re-erected, as denoted by rectangle 24 in FIG. 3, into their original erect positions for further processing.

Figure 3:
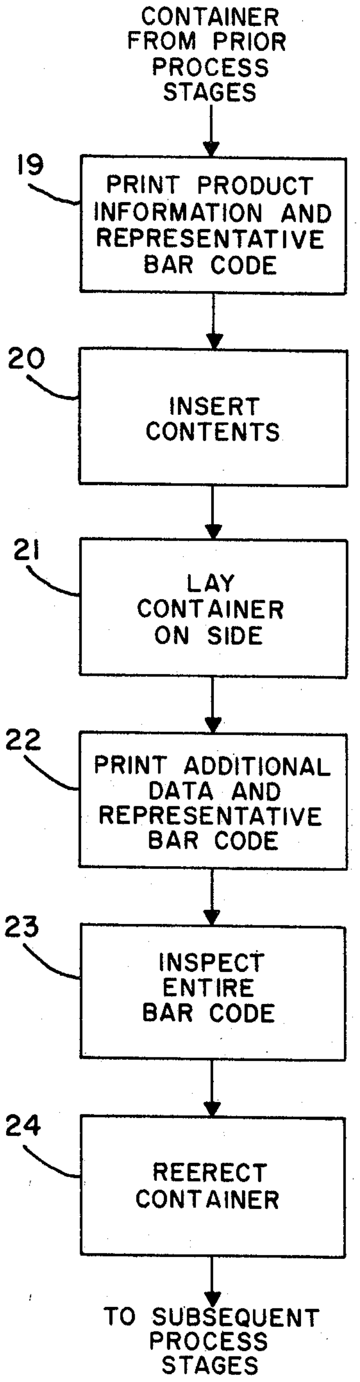
FIG. 3 is a flow diagram showing the steps which are performed in accordance with another form of the invention.

Equipment is also known for performing steps 21 and 24 of FIG. 3. This may consist, for example, of variable pitch screws. These are oriented with their axes parallel to the direction of movement of the containers and have their lands spaced so that one bottle at a time becomes engaged between adjacent ones and moves along in that position by virtue of screw rotation, or by movement of a conveyor, or both. As the inclination of the screw thread progressively changes due to the variable pitch, the bottle is correspondingly gradually tilted—from upright to lying—down in step 21 and back to upright in step 24. Alternatively, conveyor belts which run parallel to each other but at different inclinations may be used to perform a corresponding function.

Otherwise the equipment for performing the process of FIG. 3 may be similar to that for performing the process of FIG. 2.

It will be understood that many variations of the specific embodiments described above will occur to those skilled in the art without departing from the inventive concept. For example, instead of laying the bottles down and re-erecting them, as described with reference to FIG. 3 above, the bottles may be rotated in order to expose more conveniently the portions of the label containing the space for additional information and for the bar code pattern 12. This might be particularly suitable in the case of round, rather than square-corner bottles. Also it will be understood that the practice of the invention is in no way limited to bottles but is applicable to virtually any type of container, such as boxes, folding cartons, cans and so forth. Accordingly, I desire the scope of my inventive concept to be limited only by the appended claims.

I claim:

1. The process of utilizing a complete bar code pattern on a container comprising the steps of:

placing the contents in a container substantially contemporaneously with completing said bar code pattern, after said container has previously had an incomplete portion of said pattern applied thereto; and photoelectrically inspecting said bar code pattern for completeness.

2. The process of claim 1 further comprising the step of applying to said container information other than code bars simultaneously with said completing of said bar code pattern.

3. The process of claim 1 characterized in that said incomplete bar code pattern has been applied during the process of manufacture of said container.

4. The process of claim 1 characterized in that said contents are placed in said container immediately before completing said bar code pattern.

5. The process of claim 1 characterized in that said container has its orientation changed substantially contemporaneously with said completing of said bar code pattern.

6. The process of claim 1 characterized in that said container has its orientation changed twice, once before and once after said completing of said bar code pattern.

7. The process of claim 6 further characterized in that said first change in orientation is carried out between the placement of the contents in said container and said completing of said bar code pattern, and said second change in orientation is carried out after said photoelectric inspecting.

8. The process of claim 6 characterized in that said second change in orientation is substantially the inverse of the first.

References Cited

UNITED STATES PATENTS

| | | | |
|---|---|---|---|
| 2,803,448 | 8/1957 | Biebel | 250—231 X |
| 2,981,432 | 4/1961 | Flood | 141—98 X |
| 2,838,893 | 6/1958 | Sickel | 53—131 X |
| 3,035,380 | 5/1962 | Leavens | 93—34 X |
| 3,176,140 | 3/1965 | Schroth | 250—219 |
| 3,180,996 | 4/1965 | De Good et al. | 250—223 |
| 3,358,414 | 12/1967 | Hersh et al. | 53—131 X |

WALTER STOLWEIN, Primary Examiner

U.S. Cl. X.R.

53—131